United States Patent [19]

Butcher

[11] Patent Number: 5,485,922
[45] Date of Patent: Jan. 23, 1996

[54] PORTABLE COMPUTER CARRY CASE ASSEMBLY

[76] Inventor: Robert A. Butcher, 2500 Parkview Dr., #616, Hallandale, Fla. 33009

[21] Appl. No.: 323,115

[22] Filed: Oct. 14, 1994

[51] Int. Cl.$^6$ .............................. A45C 3/02; B65D 85/38
[52] U.S. Cl. ........................ 206/576; 190/18 A; 190/109; 206/320
[58] Field of Search ................................ 190/15.1, 18 A, 190/109–111, 115, 120, 900; 206/305, 320, 576

[56] References Cited

U.S. PATENT DOCUMENTS

| | | | |
|---|---|---|---|
| 4,036,336 | 7/1977 | Burtley | 190/115 |
| 4,837,590 | 6/1989 | Sprague | 206/576 |
| 4,896,776 | 1/1990 | Kabanuk et al. | 206/576 |
| 5,075,925 | 12/1991 | Maloney | 190/18 A |
| 5,075,926 | 12/1991 | Jeong | 190/115 |
| 5,226,540 | 7/1993 | Bradbury | 206/576 |
| 5,242,056 | 9/1993 | Zia et al. | 206/576 |
| 5,253,739 | 10/1993 | King | 190/18 A |
| 5,379,893 | 1/1995 | Ruiz | 206/320 |
| 5,400,903 | 3/1995 | Cooley | 206/305 |

*Primary Examiner*—Jimmy G. Foster
*Attorney, Agent, or Firm*—Malloy & Malloy

[57] ABSTRACT

A portable computer carry case assembly, to be used to safely and securely contain and transport a portable computer and various accessories therefor, the assembly having a main housing which is divided into a top compartment and a bottom compartment by a divider panel. Included within the top compartment are various support members which receive the portable computer suspended thereon in such a manner that the keyboard portion of the portable computer will be co-planar with a top edge of the main housing, and which straddle the portable computer to prevent sliding within the top compartment. Also included in the top compartment is a surge suppressor/power conditioner, which is exteriorly accessible through a power cord outlet disposed in one of the walls of the main housing, and a connector access disposed in the divider panel to facilitate access between the top and bottom compartments, the bottom compartment being structured to contain a portable computer printer and various other computer accessories which are accessible through a main opening of the bottom compartment. The main opening is sealable by a closure flap, and the top compartment is sealable by a lid hingedly secured to a top edge of one of the walls. Finally, at least one wheel and an extendable handle are included and utilized to allow the entire assembly to be conveniently pulled along atop the wheel, the entire assembly being structured to qualify as an airplane carry-on item.

19 Claims, 2 Drawing Sheets

PORTABLE COMPUTER CARRY CASE ASSEMBLY

BACKGROUND OF THE INVENTION

1. Field of the Invention

The present invention relates to a portable computer carry case assembly structured to securely hold and contain a portable laptop computer and various peripheral accessories therefor such as a portable printer and CD ROM drive, the carry case being structured to be substantially sturdy and impact resistant, will qualify as an airplane carry-on item, and be substantially easy to transport by a user, while also providing a facilitated means to transport other items such as files, a tote bag, or a briefcase.

2. Description of the Related Art

As computers become more and more essential to every day business practices, individuals, and especially those individuals who conduct a major portion of their business on the road, are utilizing laptop computers. Further, because of these "business on the go" practices, peripherals associated with the laptop computer are becoming more and more prevalent, thereby enabling users to print documents, send and receive faxes, and utilize additional, external data storage such as through a CD ROM drive. Accordingly, there is a need to provide users with a convenient, secure, and portable way to transport and utilize their portable computer systems including the laptop computer and the various peripheral devices.

Generally in the art, there are a number of differing styles and types of carry cases which are adapted for portable computer transport. These carry cases range from soft cases to rigid, padded, ultra protective type cases, usually designed to hold the portable computer until needed, at which point the user removes the computer from the carry case and sets it up in a work area. This, however, can be quite inconvenient.

Therefore, it would be substantially advantageous to provide a carry case which disposes the computer in a ready to use orientation while still in the case, thereby necessitating that a user merely open a top lid of the case, position the laptop screen, and turn on the power to provide a convenient work station.

Present in the art, are some carry cases which enable a computer to be used while still contained in the case. These carry cases, however, will usually require a complicated series of manipulations to expose the computer from its contained position within the carry case, or will not specifically be structured to position the computer in a specific, elevated, keyboard exposed position. Accordingly, such uses can become more burdensome rather than convenient because they encourage in-case use in a less than optimal configuration.

A further difficulty associated with conventionally used and implemented portable computer carry cases involves the ease with which the carry cases are transported. Specifically, as the number of documents and peripheral accessories which need to be with the personal computer increase, the carry case can become quite heavy to transport. Further, the use of a portable computer will not usually eliminate the need for an individual to carry a briefcase or a number of files, further burdening their load and making the computer more difficult to transport. As a result, some computer users turn to portable luggage carts onto which the carry case and various other items are secured for transport. These luggage carts, however, provide an additional article which must be stored or moved out of the way when using the computer, provide an additional carry-on item to be stowed in an aircraft, and can be quite unstable if the carry case is hastily and/or improperly secured thereto. Such instability will not only make transport more difficult, but will also make the carry case vulnerable to jolts and susceptible to falls from the tote which can potentially damage the computer itself and the carry case. The existence of these hazards, which are also present during luggage transport, can be evidenced by the different types of suitcases including tote means built in. These suitcases, nonetheless, would be ineffective for use in computer transport as they are not structured to securely maintain the computer in a compact, easily accessible, ready to use, orientation, and do not include the many necessary adaptations to provide for convenient and portable computer transport.

Accordingly, since the advent of portable computer use, there has been a long felt need to provide frequent laptop users with a convenient and effective carry case which is substantially secure so as to provide a protective shield for the computer and its accessories, and which maintains the computer in a stable orientation therein. Further, there is need for an assembly which maintains the computer and its peripheral items in a ready to use orientation, which will provide a user with a single, universal AC/DC power converter, and which is substantially easy to transport. The device of the present invention is structured specifically to address and solve these needs which remain present in the art.

SUMMARY OF THE INVENTION

The present invention relates to a portable computer carry case assembly structured to safely and securely contain and transport a portable computer and various accessories therefor. The assembly includes primarily a main housing having a bottom wall, a first side wall, a second side wall, a rear wall, and a front wall. All of these walls define an interior of the main housing and an open top end thereof to allow access into the interior. Further, disposed within the interior of the main housing is a divider panel which spans the entire interior and defines a top compartment and a bottom compartment within the main housing.

As to the top compartment, it includes a pair of spaced, preferably longitudinal support members which supportably receive the portable computer thereon. These support members are particularly structured such that when the portable computer is supportably positioned thereon during use, the keyboard portion of the portable computer will be co-planar with a top edge of the front wall of the main housing, thereby substantially facilitating use of the portable computer while it remains securely positioned within the top compartment. Further disposed within the top compartment are a pair of adjustably positionable, and preferably latitudinal, support members. These latitudinal support members are disposed in spaced apart relation from one another and extend between the spaced longitudinal support members in such a manner as to straddle the portable computer positioned atop the longitudinal support members. By straddling the portable computer, the latitudinal support members will prevent lateral movement of the computer within the top compartment both during use and transport. Also included within the top compartment is at least one adjustable rear spacer. The rear spacer will extend from the rear wall of the main housing to a rearmost one of the pair of spaced longitudinal support members in such a manner as to securely maintain the portable computer between the front wall and the rear spacer. In addition to securing the computer in place, the adjustable rear spacer will also define at least two auxiliary storage compartments between the rear wall and the rearmost one of the spaced longitudinal support members. These storage compartments, in addition to a storage compartment defined between the spaced longitudinal support members and the pair of the adjustably positionable latitudinal members are structured to hold connectors, accessories, computer disks, or any other necessary items.

Also disposed within the interior of the main compartment is a surge suppressor/power conditioner. The surge suppressor/power conditioner, which will preferably be secured in place within the top compartment, includes at least one electrical cord outlet and an electric cord input through which current can run from a wall socket to the various items connected thereto. In order to allow exterior access to the electric cord input of the surge suppressor/power conditioner during use of the computer, one of the walls of the main housing adjacent the surge suppressor/power conditioner includes a power cord outlet opening through which connection can be made between the surge suppressor/power conditioner and a wall outlet.

Defined in the divider panel, which separates the top and bottom compartments is a connector access. This connector access is positioned so as to facilitate access of cords and connectors between articles in a top compartment and articles in the bottom compartment. As to the bottom compartment, it is structured and disposed to contain a portable computer printer therein and has a main opening formed in the front wall of the main housing through which access to the bottom compartment is achieved. Covering this main opening of the bottom compartment is a closure flap. The closure flap is pivotally movable between a closed position, wherein the main opening is substantially covered, and an open position, wherein the bottom compartment is accessible through the main opening. Accordingly, the bottom compartment can be accessed and closed independently of the top compartment.

Secured to a top edge of one of the walls which define the main housing is a lid. The lid is hingedly movable between a closed position, in covering relation atop the open top end of the main housing, and an open position, exposing the top compartment in the main housing through the open top end. Disposed on the lid as well as the closure flap are latch means. The latch means are structured to enable securing of the lid and/or closure flap in their closed positions.

Disposed on an exterior of the rear wall of the main housing is at least one wheel. This wheel is positioned so as to support the main housing thereon, during its rotation, in such a manner as to facilitate transportation of the main housing on the wheel. In order to facilitate the transportation on the wheel, an extendable handle is included and secured to the bottom wall of the main housing. The extendable handle is structured so as to be held by a user during transport in order to maintain the main housing supportably balanced on the wheel during pulled transport of the main housing.

It is an object of the present invention to provide a portable computer carry case which is capable of securely containing a portable laptop computer as well as a number of peripheral items, without requiring that a substantially large case having a large surface area be utilized.

A further object of the present invention is to provide a portable computer carry case assembly which will independently contain accessory items, such as a portable printer, separate from the secured containment of the portable computer in an immediately usable orientation.

Yet another object of the present invention is to provide a portable computer carry case which will maintain a portable computer non-slidably and securely contained therein so as to prevent damage to the computer during transport of the case.

An additional object of the present invention is to provide a portable computer carry case assembly which is structured to supportably and securely maintain a personal computer poised in an immediately usable location within the case, the usable orientation including a keyboard of the personal computer being co-planar with a top edge of the case such that the user need not reach down into the case or remove the computer from the case in order to conveniently utilize the keyboard.

A further object of the present invention is to provide a portable computer carry case which includes facilitated means for transporting the often heavy carry case, along with other items to be transported by a user such as a briefcase, files, or a tote, which is comfortable and convenient to employ and which will maintain a main housing of the carry case securely positioned and balanced in order to prevent the carry case and computer therein from being damaged during transport by a user.

Another object of the present invention is to provide a portable computer which includes a built-in surge suppressor/power conditioner structured to ensure that the valuable computer and peripheral items will be protected from power surges and signal variations.

Still another object of the present invention is to provide a portable computer carry case which includes means to provide a well filtered and controlled DC power source of universal voltages for the various computer components, which can provide universal power conversion in order to supply power to the various computer components despite current differences of an available outlet, and which eliminates the need for the transportation of heavy and bulky AC/DC converters.

An additional object of the present invention is to provide a portable carry case which is easily and independently transportable, can contain a computer and various peripheral items, and which will qualify as an airplane carry-on item.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
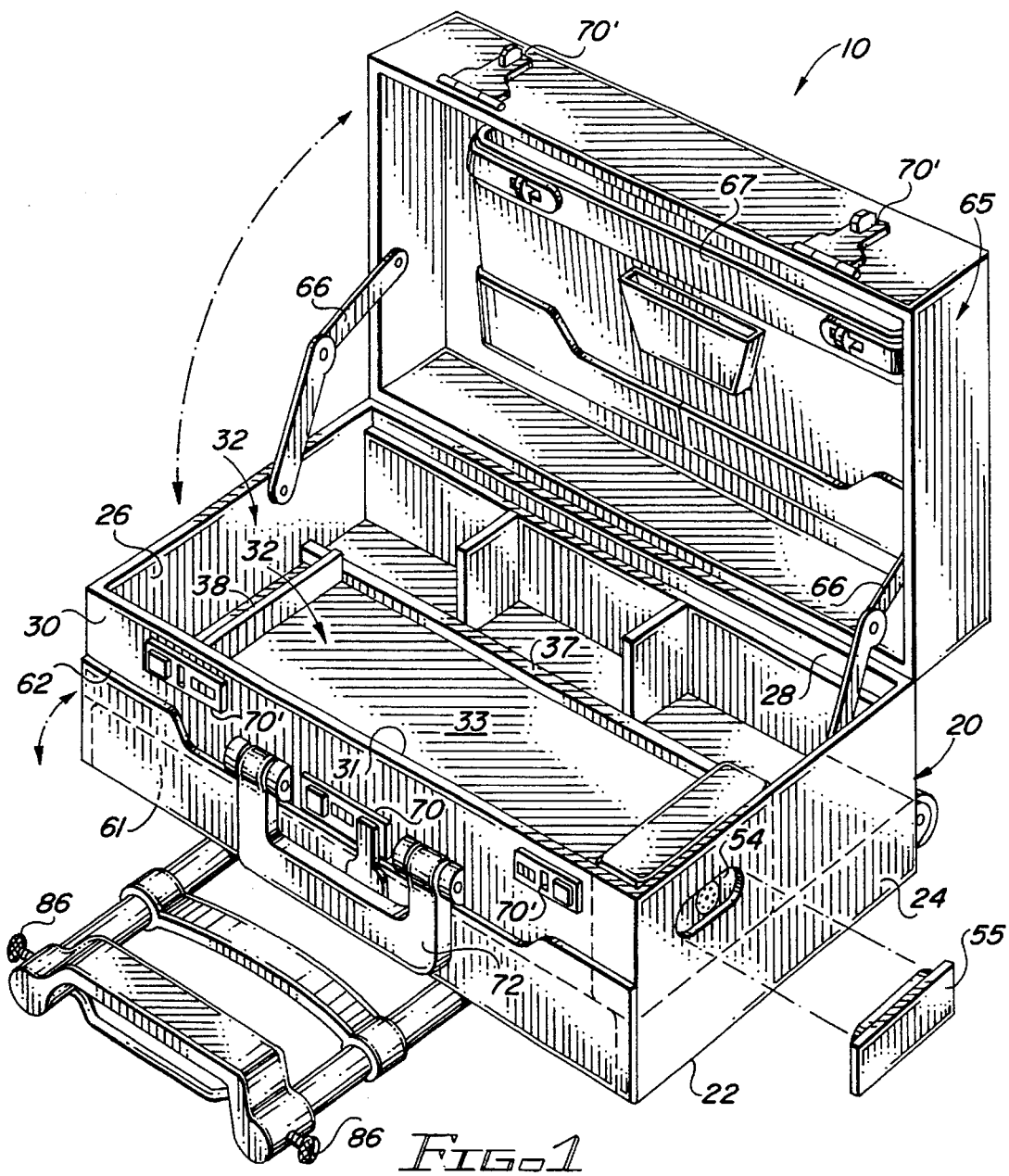
FIG. 1 is a perspective, open top view of the portable computer carry case assembly of the present invention.
Figure 3:
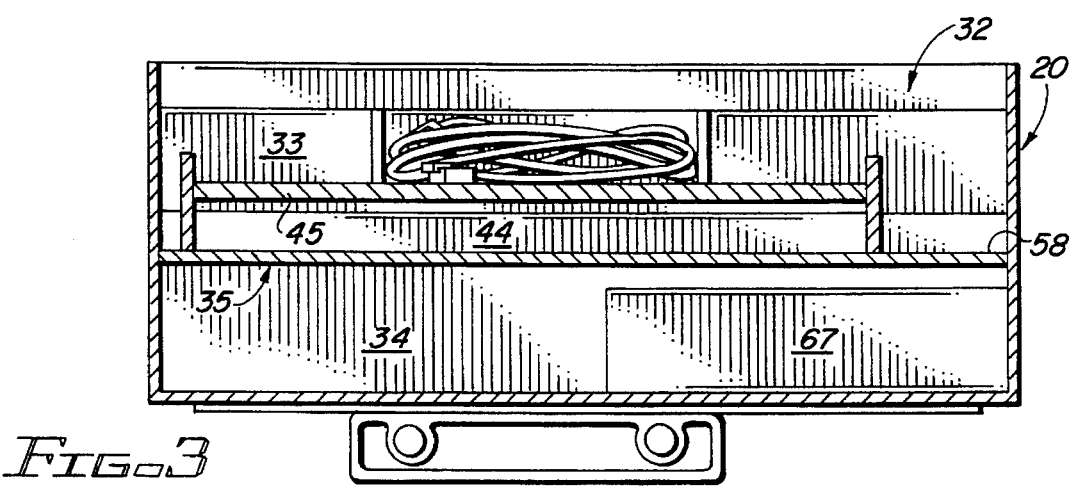
FIG. 3 is a cross-sectional view along line 3—3 of FIG. 2.
Figure 2:
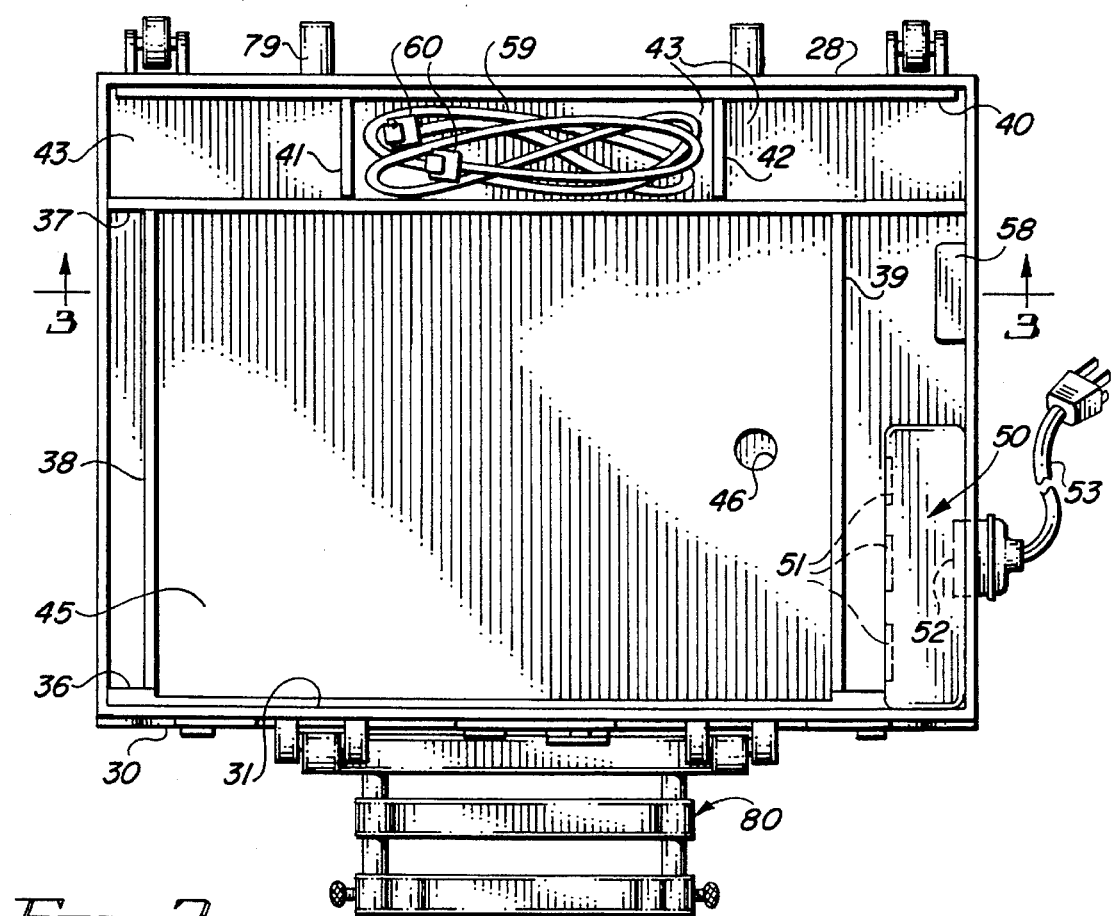
FIG. 2 is a top plan view of the portable computer carry case assembly of the present invention.
Figure 4:
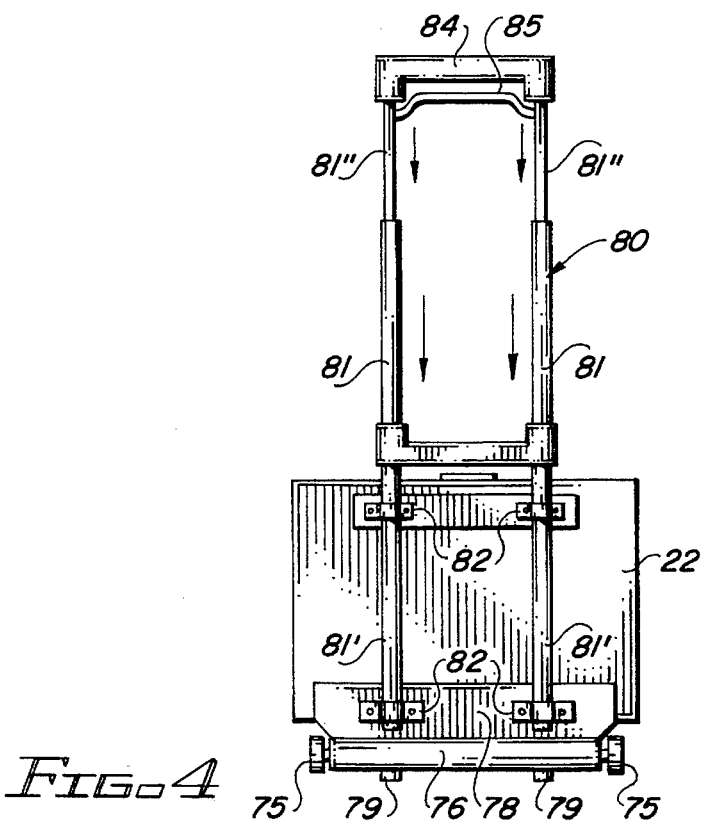
FIG. 4 is a bottom view of the portable computer carry case assembly illustrating portability thereof.

Shown throughout the Figures, the present invention is directed towards a portable computer carry case assembly, generally indicated as 10. The carry case assembly 10 is structured to safely and securely contain and transport a portable computer and various accessories therefor, and to enable convenient and immediate use of the portable computer when necessary. Included as part of the computer carry case assembly 10 of the present invention is a main housing 20. This main housing 20 includes a bottom wall 22, a first side wall 24 a second side wall 26, a rear wall 28, and a front wall 30. These walls, which are preferably substantially rigid and include an attractive finish such as leather, define an open top end of the main housing 20 and an interior 32 thereof.

Secured within the interior 32 of the main housing 20 is a divider panel 35. This divider panel 35 is preferably centrally secured to span the interior 32 in such a manner as to define a top compartment 33 and a bottom compartment 34. Preferably, the top compartment 33 and bottom compartment 34 will be approximately the same size, with possibly the top compartment 33 being slightly deeper.

Turning to the top compartment 33, it is accessible through the open top end of the main housing 20 and is preferably where the portable computer will be supportably maintained. Located within this top compartment 33 are a pair of spaced, longitudinal support members 36 and 37. These spaced longitudinal support members 36 and 37 will preferably extend from the first side wall 24 to the second side wall 26 and are positioned so as to supportably receive the portable computer thereon. Further, these spaced longitudinal support members 36 and 37 are specifically sized so as to have a height which results in a keyboard of the portable computer being co-planar with a top edge 31 of the front wall 30 of the main housing 20. In such a manner, when in use, a monitor portion of the portable computer can be elevated into a usable position, thereby exposing the keyboard which due to its positioning at an elevation co-planar with a top edge 31, can be easily and conveniently used while the computer remains within the top compartment 33.

Extending between the spaced longitudinal support members 36 and 37, and disposed in spaced apart relation from one another are a pair of adjustably positionable latitudinal support members 38 and 39. These latitudinal support members 38 and 39 will be adjustably secured within the top compartment 33 in such a manner as to straddle the portable computer once it is supportable disposed atop the longitudinal support members 36 and 37. By straddling the portable computer, the latitudinal support members 38 and 39 will prevent the portable computer from moving laterally within the top compartment 33 both during use and transport. Similarly, extending from the rear wall 28, and preferably from a securing member 40 disposed at the rear wall 28, is at least one, but preferably a pair of adjustable rear spacers 41 and 42. These rear spacers 41 and 42 extend to a rearmost one of the pair of spaced longitudinal support members 37 and are positioned so as to wedge the personal computer against the front wall 30 of the main housing 20. Accordingly, as well as not sliding laterally within the top compartment 33, the personal computer will not slide forward or backward within the top compartment 33. In addition to securely maintaining the portable computer in place, the adjustable rear spacers 41 and 42 will also define a plurality of auxiliary storage compartments 43 between the rear wall 28 and the rearmost one of the spaced longitudinal support members 37. These auxiliary storage compartments 43 can store a variety of connectors and/or supplies to be utilized while operating the portable computer and the various accessory items therefore.

Defined between the spaced longitudinal support members 36 and 37, and the pair of adjustably positionable latitudinal support members 38 and 39 is a central storage compartment 44. This central storage compartment 44, which is located within the top compartment 33 will be structured to hold a variety of papers and computer disks securely and safely beneath the portable computer suspended thereover. Additionally, a removable lid can be included and positioned in covering relation atop the central storage compartment 44. This removable lid 45 will preferably be suspended atop the longitudinal support members 36 and 37 and will receive the portable computer supportably thereon. Further, this removable lid 45 can be varied so as to ensure that the portable computer, when in operation, has its keyboard co-planar with the top edge 31 of the front wall 30 of the main housing 20. Also, to facilitate removal of this removable lid 45, a gripper opening 46 may be formed therein by which the removable lid 45 can be elevated. The various support members and spacers 36, 37, 38, 39, 40, 41, 42, located within the top compartment 33, will all preferably be formed of a rigid plastic material, but can equivalently be formed of an alternative rigid material, such as wood or metal, so as to define the various compartments and supportably hold the personal computer in place within the top compartment 33.

Additionally disposed within the interior 32, and preferably in the top compartment 33 of the main housing 20, is a surge suppressor/power conditioner 50. The surge suppressor/power conditioner 50 will include telephone line input and output plugs to allow it to screen for signal line spikes or variations. The surge suppressor/power conditioner 50 will also preferably include a plurality of electric cord outlets 51 into which conventional electrical plugs from the various electrically powered items to be contained within the carry case assembly 10 are connected in power receiving communication. Also, the surge suppressor/power conditioner 50 will include an electric cord input 52 into which a removable power cord 53 is connected. Preferably, the surge suppressor/power conditioner 50 will be secured in place within the top compartment 33 such as by fastening it to one of the side walls, such as 24, using a plurality of screws. In order for the electric cord input 52 to be exteriorly accessible when the surge suppressor/power conditioner 50, is secured in place, the side wall 24, adjacent the electric cord input 52 of the surge suppressor/power conditioner 50 will include a power cord outlet opening 54. The power cord outlet opening 54 is positioned so as to correspond the electric cord input 52, and when the electric cord outlet 52 is not in use, includes a removable cover 55. The removable cover 55 will preferably be a rigid cap having a protruding nub which will be inserted into the power cord outlet opening 54 and have overhanging flanged portions which will lie flush against an exterior of the side wall 24. Further, the protruding nub portion of the removable cover 55 can include male or female connector simulation so as to facilitate securing of the removable cover 55 into the electric cord input 52. Accordingly, when in use, the removable cover 55 is removed and the removable power cord 53 is connected at the electric cord input 52 through the outlet opening 54 and is positioned in a conventional electric outlet.

Formed in the divider panel 35, in such a manner as to facilitate access between the top compartment 33 and the bottom compartment 34, is a connector access 58. The connector access 58 is structured to allow passage therethrough of the various power cords and data connectors utilized by the portable computer and the various accessories therefor. Further, because some conventional connectors can be substantially bulky, the assembly 10 of the present invention will also include a substantially thin ribbon connector 59. Much like conventional connectors, the thin ribbon connector 59 will include standard male and female connector heads 60, but will have a substantially flat, thin body which can facilitate its passage either through the connector access 58 or past an edge of the divider 35 in order to connect a computer in the top compartment 33 with a printer in the bottom compartment 34.

Turning to the bottom compartment 34, it is specifically structured to contain a portable computer printer, as well as a plurality of other peripheral items such as an external modem or CD ROM drive. Formed in the front wall 30 of the main housing 20 is a main opening 61 of the bottom compartment 34. This main opening 61 is positioned to facilitate sliding access into the bottom compartment 34, and has a closure flap 62 disposed in covering relation thereover. Specifically, the closure flap 62 is movable between a closed position, wherein the main opening 61 is substantially covered, and an open position, wherein the bottom compartment 34 is accessible through the main opening 61. Also contained within the bottom compartment 34 is preferably a universal AC/DC converter 64. This AC/DC converter 64 is structured to take up minimal space and fit in a rear portion of the bottom compartment 34. Further, this AC/DC converter 64 is adapted to convert electrical power entering from a wall socket into the necessary DC voltage output for use with the various accessories stored within the assembly 10. Accordingly, individual, bulky adaptors for use with each device will not be required. Additionally, the converter is structured to enable connection through an electrical outlet in varying countries and locations having different current sources. Further, if sudden current drops take place, the converter 64 will compensate to allow continued functioning. Through use of this AC/DC converter 64, the electrical connections of the various electrical devices contained within the assembly can be connected therethrough in order to receive the appropriate current necessary for safe and effective operation, the converter preferably having at least one 5 volt, 12 volt, adjustable 6–9 volt, adjustable 9–12, and adjustable 14–19 volt outputs.

Hingedly secured atop a top edge of one of the walls which define the main housing 20, and preferably the rear wall 28, is a lid 65. This lid 65 is movable between a closed position, in covering relation atop the open top end of the main compartment 20, and an open position, exposing the top compartment 33 through the open top end. The lid 65 will preferably be secured and positioned by a pair of conventional briefcase type hinges 66 disposed at opposite ends of the lid 65 and extending between the lid 65 and the main compartment 20. Further, disposed on an interior of the lid 65 is at least one expandable pocket 67. The expandable pocket 67 preferably including a number of pockets and compartments disposed in a conveniently usable array.

Disposed on the assembly so as to secure the lid 65 and closure flap 62 in their closed position are latch means. Preferably, the latch means will include a number of keyed or combination, latching locks 70. One of the locks 70 is centrally disposed to secure the closure flap 62 to the front wall 30. Similarly, a pair of spaced locks 70' are disposed to secure the lid 65 to the front wall 30, thereby providing some security for the interior of the main housing 20.

In order to facilitate transport of the entire assembly 10, a briefcase handle 72 is hingedly secured to the front wall 30 of the main housing 20 above the closure flap 62. This briefcase handle 72 is positioned to enable the entire assembly 10 to be lifted thereby when necessary. Additionally, and in order to facilitate transportability of the assembly 10, at least one, but preferably a pair of wheels 75 as well as an extendable handle 80 are included. The wheels 75 are rotatably secured on an exterior of the rear wall 28 of the main housing 20 and are structured and positioned to enable the entire main housing 20 to be supported thereon during rotation of the wheels 75 when the extendable handle 80 is pulled. More particularly, the wheels 75 are secured at opposite ends of an elongate carriage 76 which is secured to the rear wall 28. Further, and preferably integrally formed with the carriage 76, a curb guard 78 extends along an edge of the bottom wall 22 adjacent the rear wall 28. Specifically, the curb guard 78 will be made of a rigid durable material, such as a hard plastic, so as to shield the main housing 20 from direct impacts if the main housing 20 is pulled over an uneven surface which may contact and potentially scuff or damage the main housing 20. Positioned a spaced distance from the wheels 75 on the rear wall 28 is a support base 79. This support base 79 is positioned such that when the assembly 10 is disposed to maintain the main housing 20 in a vertical orientation atop the wheels 75, the support base 79 will also function to supportably maintain the main housing 20 in a stable, balanced orientation.

As to the extendable handle 80, it is structured such that when held by a user, the main housing 20 is supportably balanced atop the wheels 75, and that by pulling the extendable handle 80, the entire assembly 10 will be pulled along atop the wheels 75. In particular, the extendable handle 80 includes a plurality of telescoping members 81 which are structured to be fitted within one another in a telescoping fashion. The outermost ones of the telescoping members 81' will be mounted to the bottom wall 22 of the main housing 20 through a plurality of mount brackets 82, thereby fixedly and securely holding the entire extendable handle 80 in place. Further, this functions to maintain the main housing 20 in a secure, well-balanced orientation to facilitate transport and ensure that the main housing 20 will not fall off during transport. Extending between the pair of telescoping members 81", at a distalmost end of the extendable handle 80, is a gripping handle 84. The gripping handle 84 is structured to be held by a user during pulling of the entire assembly 10. Further, secured adjacent the gripper handle 84 is a telescoping trigger 85 which when pulled by a user, will unlock the telescoping members 81 from their secured, extended position. The specific functioning of the extendable handle 80 and the trigger can be in any of a variety of conventional structures and will preferably include a number of lock pins and are secured to elongate rods connected to and actuated by the trigger 85. Finally, protruding from the gripper handle 84 will be a pair of nubs 86 to which elastic fasteners may be secured should the assembly 10 be utilized to transport a number of additional articles such as a briefcase, tote, or files which can be conveniently disposed atop the top wall 30 of the main housing when the main housing is disposed in its vertical orientation. Further, the case is specifically sized such that it will qualify as an airplane carry-on item.

Now that the invention has been described,

What is claimed is:

1. To safely and securely contain and transport a portable computer and various accessories therefor, a portable computer carry case assembly comprising:

(a) a main housing including a bottom wall, a first side wall, a second side wall, a rear wall and a front wall defining an open top end and an interior of said main housing, (b) a divider panel disposed in said interior of said main housing and defining a top compartment and a bottom compartment therein, (c) said top compartment including:
   a pair of spaced longitudinal support members structured and disposed to supportably receive the portable computer thereon such that a keyboard portion of the portable computer is co-planar with a top edge of said front wall of said main housing,
   a pair of adjustably positionable latitudinal support members disposed in spaced apart relation from one another and extending between said spaced longitudinal support members so as to straddle the portable computer and prevent the portable computer from moving laterally within said top compartment,
   at least one adjustable rear spacer extending from said rear wall of said main housing to a rearmost one of said pair of spaced longitudinal support members so as to securely maintain the portable computer between said front wall and said rear spacer,
   said at least one adjustable rear spacer defining at least two auxiliary storage compartments between said rear wall and said rearmost one of said spaced longitudinal support members,
   said pair of spaced longitudinal support members and said pair of adjustably positionable latitudinal support members defining a central storage compartment structured and disposed to safely and securely contain computer disks,
(d) a surge suppressor/power conditioner disposed within said interior of said main compartment, said surge suppressor/power conditioner including at least one electric cord outlet and an electric cord input,
(e) a power chord outlet opening disposed in one of said walls of said main housing so as to allow exterior access to said electric cord input of said surge suppressor/power conditioner,
(f) a connector access disposed in said divider panel so as to facilitate access between said top compartment and said bottom compartment,
(g) said bottom compartment being structured and disposed to contain a portable computer printer therein and including a main opening formed in said front wall of said main housing,
(h) a closure flap disposed in covering relation over said main opening of said bottom compartment, said closure flap being movable between a closed position wherein said main opening is substantially covered and an open position wherein said bottom compartment is accessible through said main opening,
(i) a lid hingedly secured to a top edge of one of said walls defining said main housing, said lid being movable between a closed position in covering relation atop said open top end and an open position exposing said top compartment through said open top end,
(j) latch means structured and disposed to secure said lid in said closed position and to secure said closure flap in said closed position,
(k) at least one wheel rotatably disposed on an exterior of said rear wall of said main housing, said wheel being structured and disposed to support said main housing thereon during rotation thereof so as to facilitate transportation of said main housing, and
(l) an extendable handle secured to said bottom wall of said main housing, said extendable handle being structured and disposed to be held by a user so as to maintain said main housing supportably atop said at least one wheel for facilitated transport pulling of said main housing.

2. A portable computer carry case assembly as recited in claim 1 further including at least one substantially thin ribbon connector structured and disposed to connect the personal computer disposed in said top compartment with the printer disposed in said bottom compartment.

3. A portable computer carry case assembly as recited in claim 1 wherein said storage compartment in said top compartment includes a removable lid disposed in covering relation thereon so as to conceal and protect an interior of said storage compartment and so as to supportably receive the portable computer thereon.

4. A portable computer carry case assembly as recited in claim 1 wherein said power chord outlet opening includes a removable cover structured and disposed to cover and conceal said electric chord input of said surge suppressor/power conditioner from exterior access.

5. A portable computer carry case assembly as recited in claim 4 further including a removable power chord structured to be stored within said main housing when not in and use, and be secured to said electric chord input of said surge suppressor/power conditioner when in use.

6. A portable computer carry case assembly as recited in claim 1 wherein said lid includes at least one expandable pocket disposed on an interior surface thereof.

7. A portable computer carry case assembly as recited in claim 1 wherein said latch means includes a lock structured and disposed to lock said lid and said closure flap in said closed position.

8. A portable computer carry case assembly as recited in claim 1 including a pair of spaced wheels disposed on said rear wall of said main housing near an edge thereof adjacent said bottom wall.

9. A portable computer carry case assembly as recited in claim 8 including a support base disposed on said rear wall in spaced apart relation from said pair of wheels, said support base being structured and disposed so as to supportably maintain said main housing in a vertical orientation atop said pair of wheels and said support base.

10. A portable computer carry case assembly as recited in claim 9 including a curb guard disposed on an edge of said bottom wall adjacent said rear wall, said curb guard being structured to shield said main housing from direct impacts upon said main housing being pulled over an uneven surface.

11. A portable computer carry case assembly as recited in claim 1 including a briefcase handle hingedly secured to said front wall of said main housing above said closure flap.

12. A portable computer carry case assembly as recited in claim 1 wherein said extendable handle includes a plurality of telescoping members secured to said bottom wall of said main housing in spaced apart relation from one another, and a gripping handle extending between said pair of telescoping members at distalmost ends thereof.

13. A portable computer carry case assembly as recited in claim 1 further including a universal AC/DC converter disposed in said bottom compartment and structured to receive a single AC input and provide a plurality of varied DC voltage outputs.

14. A portable computer carry case assembly as recited in claim 1 structured to be substantially compact and qualify as an airplane carry-on item.

15. To safely and securely contain and transport a portable computer and various accessories therefor, a portable computer carry case assembly comprising:
   (a) a main housing including a bottom wall, a first side wall, a second side wall, a rear wall and a front wall defining an open top end and an interior of said main housing, (b) a divider panel disposed in said interior of said main housing and defining a top compartment and a bottom compartment therein, (c) said top compartment including:

a pair of spaced support members structured and disposed to supportably receive the portable computer thereon such that a keyboard portion of the portable computer is coplanar with a top edge of said front wall of said main housing, stabilizing means structured and disposed to prevent the portable computer from sliding around within said top compartment, (d) a surge suppressor/power conditioner disposed within said interior of said main compartment, said surge suppressor/power conditioner including at least one electric cord outlet and an electric cord input, (e) a power chord outlet opening disposed in one of said walls of said main housing so as to allow exterior access to said electric cord input of said surge suppressor/power conditioner, (f) a connector access disposed in said divider panel so as to facilitate access between said top compartment and said bottom compartment, (g) said bottom compartment being structured and disposed to contain a portable computer printer therein and including a main opening formed in a front wall of said main housing, (h) a closure flap disposed in covering relation over said main opening of said bottom compartment, said closure flap being movable between a closed position wherein said main opening is substantially covered and an open position wherein said bottom compartment is accessible through said main opening, (i) a lid hingedly secured to a top edge of one of said walls defining said main housing, said lid being movable between a closed position in covering relation atop said open top end and an open position exposing said top compartment through said open top end, (j) latch means structured and disposed to secure said lid in said closed position and to secure said closure flap in said closed position, (k) at least one wheel rotatably disposed on an exterior of said rear wall of said main housing, said wheel being structured and disposed to support said main housing thereon during rotation thereof so as to facilitate transportation of said main housing, and (l) an extendable handle secured to said bottom wall of said main housing, said extendable handle being structured and disposed to be held by a user so as to maintain said main housing supportably atop said at least one wheel for facilitated transport pulling of said main housing.

16. An assembly as recited in claim 15 wherein said stabilizing means includes a pair of adjustably positionable latitudinal support members disposed in spaced apart relation from one another and extending between said spaced support members so as to straddle the portable computer and prevent the portable computer from moving laterally within said top compartment.

17. An assembly as recited in claim 16 wherein said stabilizing means further includes at least one adjustable rear spacer extending from said rear wall of said main housing to a rearmost one of said pair of spaced support members so as to securely maintain the portable computer between said front wall and said rear spacer.

18. An assembly as recited in claim 17 wherein said at least one adjustable rear spacer defines at least two auxiliary storage compartments between said rear wall and said rearmost one of said spaced support members.

19. An assembly as recited in claim 18 wherein said pair of spaced support members and said pair of adjustably positionable latitudinal support members define a storage compartment structured and disposed to safely and securely contain computer disks.

* * * * *